United States Patent
de Villiers Prichard et al.

(10) Patent No.: US 8,549,590 B1
(45) Date of Patent: Oct. 1, 2013

(54) SYSTEMS AND METHODS FOR IDENTITY AUTHENTICATION USING A SOCIAL NETWORK

(75) Inventors: Johannes Philippus de Villiers Prichard, Boynton Beach, FL (US); Jesse C P B Shaw, Saint Cloud, MN (US)

(73) Assignee: LexisNexis Risk Solutions FL Inc., Boca Raton, FL (US)

( * ) Notice: Subject to any disclaimer, the term of this patent is extended or adjusted under 35 U.S.C. 154(b) by 0 days.

(21) Appl. No.: 13/541,092

(22) Filed: Jul. 3, 2012

(51) Int. Cl.
*G06F 7/04* (2006.01)

(52) U.S. Cl.
USPC ................. 726/5; 726/21; 726/27; 713/161; 713/183; 713/185

(58) Field of Classification Search
None
See application file for complete search history.

(56) References Cited

U.S. PATENT DOCUMENTS

| | | | |
|---|---|---|---|
| 2008/0033941 A1 | 2/2008 | Parrish | |
| 2009/0119299 A1* | 5/2009 | Rhodes | 707/9 |
| 2011/0119230 A1 | 5/2011 | Zuber | |
| 2012/0159647 A1* | 6/2012 | Sanin et al. | 726/28 |
| 2012/0215597 A1* | 8/2012 | Ross | 705/14.1 |
| 2012/0227086 A1* | 9/2012 | Dale et al. | 726/3 |

* cited by examiner

*Primary Examiner* — Shewaye Gelagay
(74) *Attorney, Agent, or Firm* — Mark Lehi Jones; Ryan A. Schneider, Esq.; Troutman Sanders LLP

(57) ABSTRACT

Certain embodiments of the invention may include systems and methods for identity authentication using an social network. According to an exemplary embodiment of the invention, a method is provided for authenticating an identity of a target person. The method can include determining, from a first system graph, connections between one or more hypothetical identities and a plurality of related entities associated with the one or more hypothetical identities; determining, from a second system graph, one or more real entities associated with the target person; identifying matches comprising common real entities associated with the target person and related entities associated with the one or more hypothetical identities based at least in part on the determined connections; and providing an indication of identity authentication of the target person based at least in part on the identified matches.

15 Claims, 4 Drawing Sheets

SYSTEMS AND METHODS FOR IDENTITY AUTHENTICATION USING A SOCIAL NETWORK

FIELD OF DISCLOSED TECHNOLOGY

This invention generally relates identity authentication, and in particular, to utilization of a social network for authenticating an identity.

BACKGROUND

Identity fraud continues to present difficult challenges for many businesses, public operations, e-commerce, law enforcement, and other systems that rely on a person's true identity. For example, institutions may unknowingly open credit accounts or provide goods and/or services based on identity information supplied by an applicant. Unfortunately, some individuals provide misleading, inaccurate, or outright fraudulent identity information. Although such fraud incidents are rare, they can be very costly. Technically well-informed fraud perpetrators with sophisticated deception schemes are likely to continue targeting financial institutions, particularly if robust identity authentication mechanisms are not in place.

BRIEF SUMMARY

Some or all of the above needs may be addressed by certain embodiments of the invention. Certain embodiments of the invention may include systems and methods for identity authentication using a social network. According to an exemplary embodiment of the invention, a method is provided for authenticating an identity of a target person. The method can include determining, from a first system graph, connections between one or more hypothetical identities and a plurality of related entities associated with the one or more hypothetical identities. The method includes determining, from a second system graph, one or more real entities associated with the target person; identifying matches comprising common real entities associated with the target person and related entities associated with the one or more hypothetical identities based at least in part on the determined connections; and providing an indication of identity authentication of the target person based at least in part on the identified matches.

According to another exemplary embodiment, a system is provided. The system can include at least one memory for storing data and computer-executable instructions; and at least one processor configured to access the at least one memory and further configured to execute the computer-executable instructions to determine, from a first system graph, connections between one or more hypothetical identities and a plurality of related entities associated with the one or more hypothetical identities; determine, from a second system graph, one or more real entities associated with the target person; identify matches comprising common real entities associated with the target person and related entities associated with the one or more hypothetical identities based at least in part on the determined connections; and provide an indication of identity authentication of the target person based at least in part on the identified matches.

According to another exemplary embodiment, a non-transitory computer-readable medium is provided. The computer-readable medium stores instructions executable by one or more processors to perform a method of determining, from a first system graph, connections between one or more hypothetical identities and a plurality of related entities associated with the one or more hypothetical identities; determining, from a second system graph, one or more real entities associated with the target person; identifying matches comprising common real entities associated with the target person and related entities associated with the one or more hypothetical identities based at least in part on the determined connections; and providing an indication of identity authentication of the target person based at least in part on the identified matches.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
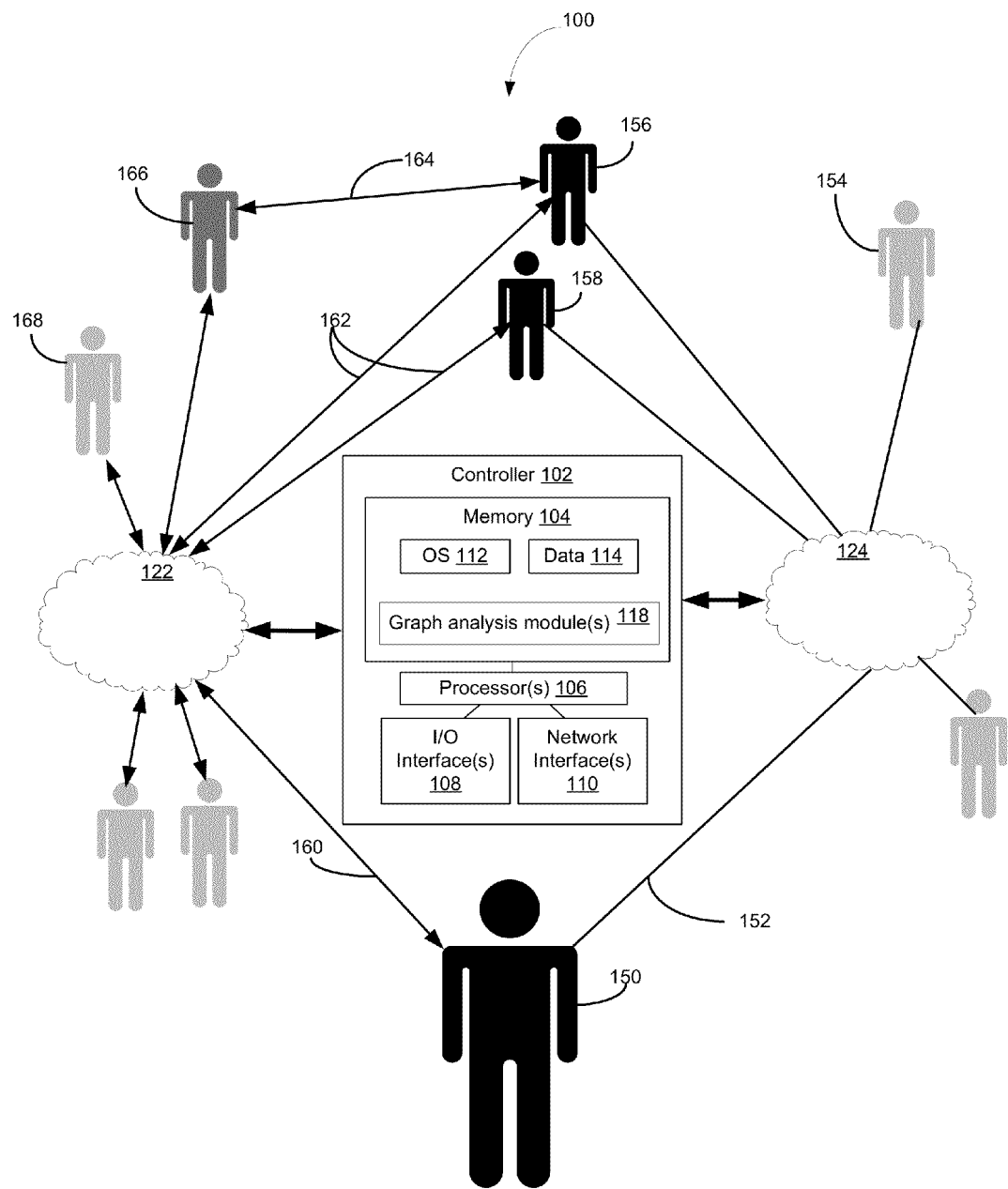
FIG. 1 is a block diagram of an illustrative an authentication system 100, according to an exemplary embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is to be understood that embodiments of the invention may be practiced without these specific details. In other instances, well-known methods, structures and techniques have not been shown in detail in order not to obscure an understanding of this description. The term "exemplary" herein is used synonymous with the term "example" and is not meant to indicate excellent or best. References to "one embodiment," "an embodiment," "exemplary embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Certain embodiments of the invention may enable authenticating the identity of an individual based on one or more established relationships with others within certain networks. According to exemplary embodiments, system graphs may represent the networks, and relationships (edges) between individuals (nodes) in the network may be determined and compared with other network system graphs to authenticate a person's identity. Embodiments of the invention may utilize various visible, hidden, public, private, open, and/or closed networks to authenticate the identity. For example, an open or visible network may include certain public records, established databases, etc., that contain information about a particular individual. An open network may include, but is not limited to publicly available data, including names, addresses, marriage information, phone numbers, etc. Such open network information may be obtained from records that are kept and maintained, for example, by city, county, and/or state entities. In certain exemplary embodiments, a hidden, private or closed network may include information that is not necessarily available to the general public, such as contacts, friends, colleagues, etc., that are part of a social or professional network.

Information that may be particularly useful from the open network can include information that may indicate one or more links, connections, relationships, etc., between a particular individual and his/her network of friends, colleagues, spouses, roommates, etc. A public record may be utilized, for example, to determine that John Smith and Jane Smith owned and occupied a house together in 2011. It would then stand to reason that John Smith knows Jane Smith, and therefore, the two may also have common connections in a closed network.

According to exemplary embodiments of the invention, networks for which system graphs can be derived may include social networks, such as Facebook™, Linkedin™ Foursquare™, Habbo™, etc. Currently, there are over 200 such social networking sites worldwide. Such social networks typically require an establishment of a two-way relationship between individuals, and therefore, such relationships and connections in a social network may be fundamentally different that those established via public records.

In an exemplary embodiment, two-way relationships may be established within a social network when a first person sends a connection request to a second person, and the second person approves the connection. In this manner, both the first person and the second person agree to establish the connection, hence the "two-way" designation. In an exemplary embodiment, relationships can be further characterized by degree, or number of intervening connections. For example, an isolated two-way relationship may be characterized with degree=1. According to an exemplary embodiment, the second person may have a two-way relationship with a third person, and therefore, the relationship between the first person and the third person may be considered (in isolation) to be a relationship with a degree=2, and so on. In accordance with exemplary embodiments, and as will be discussed subsequently with reference to FIG. 2, the existence of surrounding common connections (for example, multiple first-, second-, third-, fourth-degree, etc.,) may be utilized to strengthen related connections. In an exemplary embodiment, such surrounding and/or related connections may be utilized to modify the degree of a particular connection, for example, from a connection with a degree=1 to a degree=0.7, where the strength of the connection is affected by surrounding connections and is inversely proportional to the degree.

According to exemplary embodiments, relationships or connections between individuals may be represented using graph theory, which can be used to describe the qualities shared by the many different types of relationships between individuals. A graph is defined as a set of connected objects called vertices or nodes. The connections between the objects are called edges. Set theory formally defines a graph as an ordered pair where N is a set of nodes and E is a set of edges. Each edge is written as a pair of nodes. For example, a graph may include the following 9 nodes: N={1,2,3,4,5,6,7,8,9} where direct relationships among the nodes may be expressed by edges that include a listing of a pair of nodes. For example, a graph may consist of the following edges: E={{1,2},{1,3}, {1,4},{1,5},{1,6},{1,7},{1,8},{3,6},{3,7},{6,9}}. In this example, node number 1 is connected by first-degree edges with all other nodes except node number 9. Node number 1 is connected to node number 9 indirectly via node number 6. Since node number 1 and node number 3 are both connected to node number 6, and since node number 1 is connected to node number 3, such a connection may {1, 3} may be considered to have a stronger connection (with a degree less than 1) due to the presence of connections {1,6} and {3, 6}.

In accordance with exemplary embodiment of the invention, a graph can be either directed or undirected, where the set pairs are ordered or unordered, respectively. A directed graph, for example, means that a direction of a connection has some significance. According to an exemplary embodiment, all edges of a two-way connection are bi-directional. Furthermore, as previously discussed, the degree of a node may be characterized by number of edges away it is from the central or target node. This formal set theory provides a means for describing a set of nodes and edges and comparing them with another.

Within the public record space, each identification or node may represent an entity extracted from the myriad of data housed in the repository. According to an exemplary embodiment, nodes may be clustered based on the number and type of public record for which two entities are found together, for example, via marriages, divorces, shared assets, deeds, assessment records, automobile, watercraft and aircraft licensure, and shared addresses where cohabitation is recorded for more than a set number of months. Shared record types also help signify the strength of the relationship between the two nodes. For example, shared asset ownership may carry a stronger link than shared address. According to an exemplary embodiment, each cluster in a graph may include a centroid node identity and first-, second-, third-, etc., -degree node related identities.

According to an exemplary embodiment of the invention, a targeted person may be unable to sufficiently influence social network data around him or her, and such data may be utilized to verify his or her identity. In an exemplary embodiment, the greater the number of verified details about related people who are linked to the target identity, the more real the target identity becomes. It may impossible for the target identity to completely fabricate enough connections within both a public record and a social network to synthesize an identity. According to certain exemplary embodiments, information from public record may be utilized for analysis and may be updated as new information is available. Such information may include date of birth, date of death, address, phone number, registration, etc.

Various systems and methods may be utilized for authenticating and individual's identity, according to exemplary embodiments of the invention, and will now be described with reference to the accompanying figures.

FIG. 1 illustrates an authentication system 100 that utilizes a first network 122 and a second network 124, according to an exemplary embodiment of the invention, for authenticating the identity of a target individual 150. For example, records in the first network 124 that are associated 152 to the targeted individual 150 may be examined to determine associated first network individuals 154, 156, 158 that may be connected in some way with the target individual 150. In accordance with an exemplary embodiment of the invention, relationship information in the second network 122 may be analyzed to determine associated second network individuals 156, 158, 166, 168, that are associated 160 with the target individual 150 by two-way relationships (as indicated by the arrows). According to certain exemplary embodiments, the associations may be by first degree connections 162, second degree connections 164, etc., depending on the number of intervening connections.

The example authentication system 100 shown in FIG. 1 depicts two individuals 156, 158 that are associated 152, 160 to the target individual 150 via both the first network 124 and the second network 122 by first degree connections 162 (or degree of one). Also shown, for example purposes, is a second network individual 166 that is associated 160 with the target individual 150 via the second network 122 by a first degree connection, and who also is connected directly 164 with an individual 156 who is connected to the target individual 150 via both the second network 122 and the first network 124 by first degree connections 162. According to an exemplary embodiment, this type of relationship would tend to add more weight, verification, credibility, strength etc., to the connections. Put another way, such a relationship may strengthen the associated connection 162 so that it may be considered to be a connection having a degree less that one, as discussed above, where the strength of the connection may be inversely related to the degree of the connection.

FIG. 1 also depicts a processing system or controller 102 that may be in communication with, or otherwise, be configured to process information obtained from the first network 124 and/or the second network 122. According to an exemplary embodiment of the invention, the controller 102 may include a memory 104, one or more processors 106, one or more input/output interface(s) 108, and one or more network interface(s) 110. In accordance with an exemplary embodiment the memory 104 may include an operating system 112 and data 114. In an exemplary embodiment the memory may be configured to host one or more graph analysis modules 118 for instructing the one or more processors 106 in analyzing relationships within and among the open network 124 and/or the closed network 122. Further detailed exemplary embodiments of one or more servers or computers that may be utilized will be discussed below with reference to FIG. 3.

Figure 2:
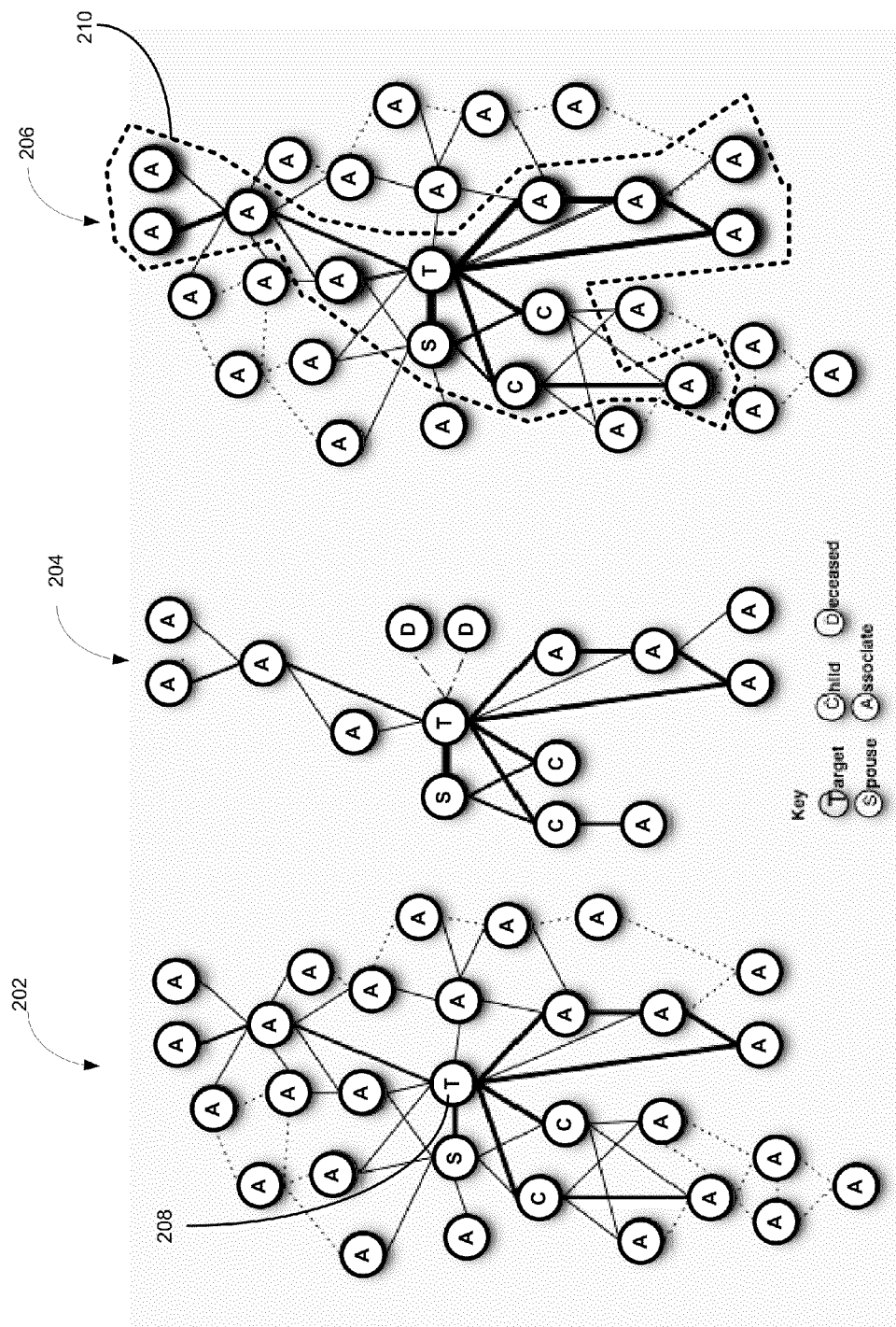
FIG. 2 depicts illustrative graphs and sub-graphs for authentication according to an exemplary embodiment of the invention.

FIG. 2 depicts example related network graphs 202, 204, 206, that may be utilized for graphically representing relationships between and/or among a target identity 208 and others (for example, a spouse, children, deceased individuals, associates, etc.). For example, a first graph 202 may be drawn that connects a target identity 208 with all related individuals. According to an exemplary embodiment, the first graph 202 may be created based on the target identity 208 at the centroid of the graph analysis, wherein nodes and edges are created based on the relationships that include the target identity 208. According to an exemplary embodiment of the invention, a similar process may be carried out with identities surrounding the target identity 208 at the centroid of the graph analysis to determine their related network. In accordance with an exemplary embodiment, the various determined networks (with the target identity 208 as the centroid, and then with related individuals as the centroid) may be overlaid, summed, ranked, etc., and/or compared with another network to determine or isolate particular relationships from first network graph 202 to produce a sub-graph 204. In accordance with an exemplary embodiment, the sub-graph 204 may represent those persons and relationships (i.e., nodes and edges) that are common to two or more different networks. According to an exemplary embodiment, the original first graph 202 may be redrawn 206 with the common individuals 210 indicated, and such data may be saved to enhance the speed of the analysis in subsequent passes.

Figure 3:
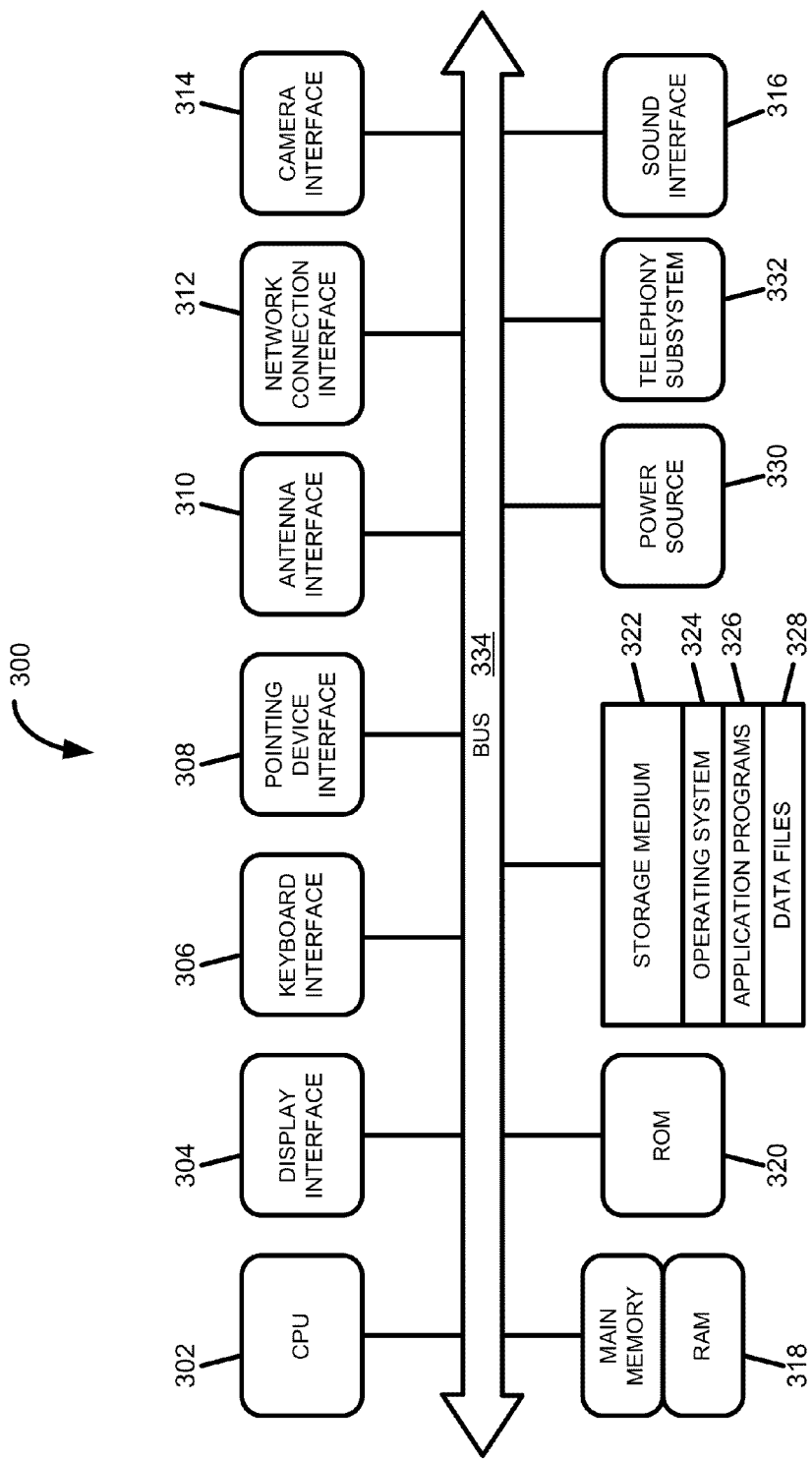
FIG. 3 is a block diagram of illustrative system architecture 300, according to an exemplary embodiment of the invention.

Various embodiments of the graph analysis systems and methods herein may be embodied in non-transitory computer readable media for execution by a processor. An exemplary embodiment may be used in an application of graph analysis. FIG. 3 illustrates schematic diagram of internal architecture of an exemplary computing device 300. It will be understood that the architecture illustrated in FIG. 3 is provided for exemplary purposes only and does not limit the scope of the various embodiments of the communication systems and methods.

The architecture of FIG. 3 includes a central processing unit (CPU) 302, where computer instructions are processed; a display interface 304 that acts as a communication interface and provides functions for rendering video, graphics, images, and texts on the display, provides a set of built-in controls (such as buttons, text, and lists), and supports diverse screen sizes; a keyboard interface 306 that provides a communication interface to a keyboard; a pointing device interface 308 that provides a communication interface to a pointing device; an antenna interface 310 that provides a communication interface to an antenna; a network connection interface 312 that provides a communication interface to a network; a camera interface 314 that acts as a communication interface and provides functions for capturing digital images from a camera; a sound interface 316 that provides a communication interface for converting sound into electrical signals using a microphone and for converting electrical signals into sound using a speaker; a random access memory (RAM) 318 where computer instructions and data are stored in a volatile memory device for processing by the CPU 302; a read-only memory (ROM) 320 where invariant low-level systems code or data for basic system functions such as basic input and output (I/O), startup, or reception of keystrokes from a keyboard are stored in a non-volatile memory device; a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that include an operating system 324, application programs 326 (including, for example, a web browser application, a widget or gadget engine, and or other applications, as necessary) and data files 328 are stored; a power source 330 that provides an appropriate alternating current (AC) or direct current (DC) to power components; and a telephony subsystem 332 that allows the device 300 to transmit and receive sound over a telephone network. The constituent devices and the CPU 302 communicate with each other over a bus 334.

The CPU 302 has appropriate structure to be a computer processor. In one arrangement, the computer CPU 302 is more than one processing unit. The RAM 318 interfaces with the computer bus 334 so as to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data is stored in the RAM 318, where the data is accessed by the computer CPU 302 during execution. In one exemplary configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

Figure 4:
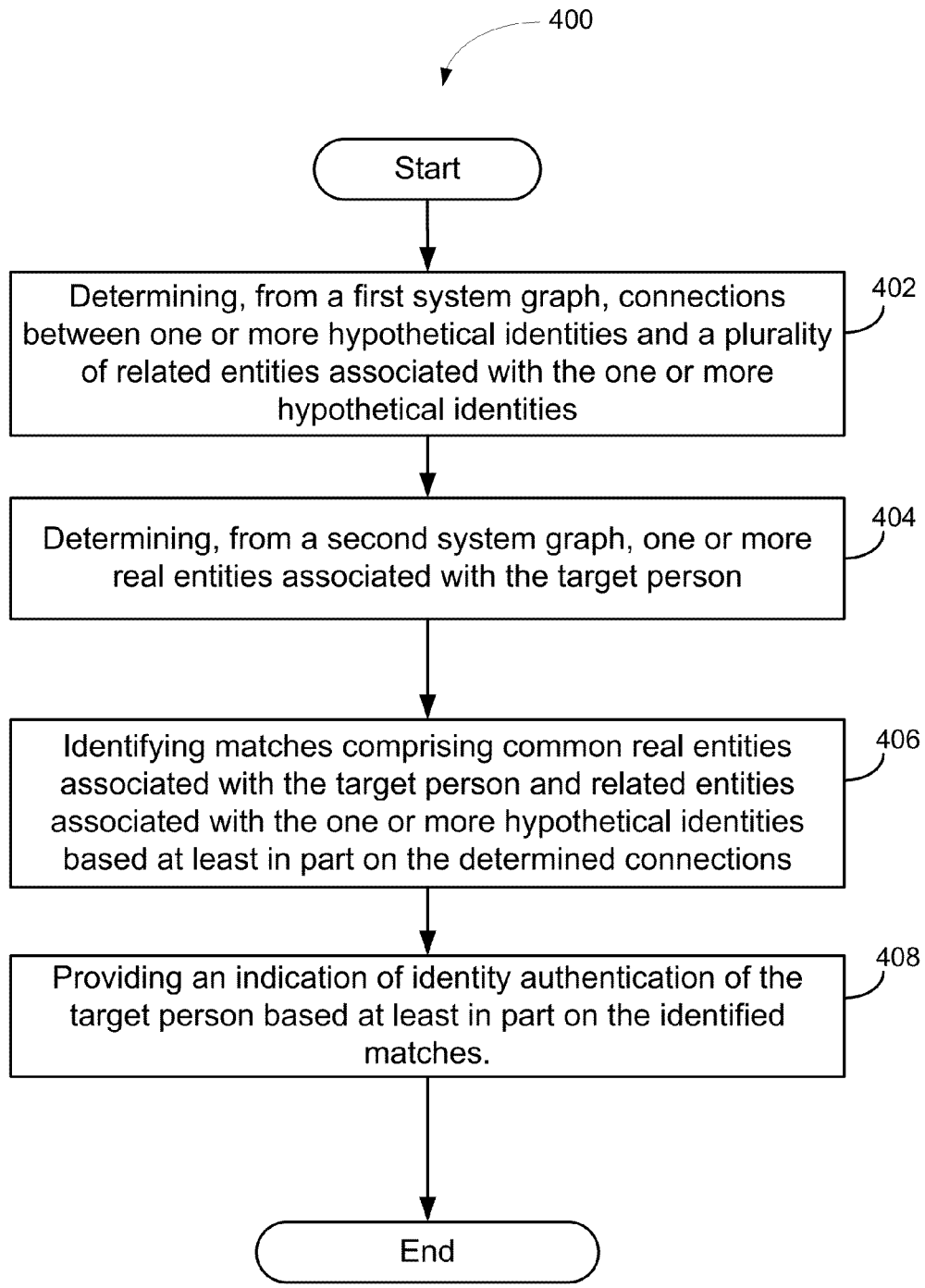
FIG. 4 is a flow diagram of a method according to an exemplary embodiment of the invention.

An exemplary method 400 for authenticating an identity of a target person will now be described with reference to the flowchart of FIG. 4. The method 400 starts in block 402, and according to an exemplary embodiment of the invention includes determining, from a first system graph, connections between one or more hypothetical identities and a plurality of related entities associated with the one or more hypothetical identities. In block 404, the method 400 includes determining, from a second system graph, one or more real entities associated with the target person. In block 406, the method 400 includes identifying matches comprising common real entities associated with the target person and related entities associated with the one or more hypothetical identities based at least in part on the determined connections. In block 408, the method 400 includes providing an indication of identity authentication of the target person based at least in part on the identified matches. The method 400 ends after block 408.

According to exemplary embodiments, the connections between the one or more hypothetical identities and the plurality of related entities include bi-directional connections. In certain exemplary embodiments, connections between the one or more hypothetical identities and the plurality of related entities comprise at least first degree connections. In certain exemplary embodiments, one or more of the first system graph or the second system graph includes at least one social network. In certain exemplary embodiments, one or more of the first system graph or the second system graph includes information derived from public records.

Exemplary embodiments include determining a graph of at least one first degree connection between the one or more hypothetical identities and a plurality of related entities associated with the one or more hypothetical identities. Exemplary embodiments further include determining one or more extended graphs having connections between at least a portion of the plurality of related entities associated with the hypothetical identities and associated extended entities associated with the plurality of related entities; and identifying matches including common real entities associated with the target person and the extended entities. Extended entities may include those entities that are connected to the target indirectly, or who have a connection with a degree higher than one.

According to exemplary embodiments, certain technical effects can be provided, such as creating certain systems and methods that enable authenticating a person's identity. Exemplary embodiments of the invention can provide the further technical effects of providing systems and methods for comparing two or more networks to determine the authenticity of a person by common relationships within the two or more networks.

In exemplary embodiments of the invention, the authentication system 100 and the system architecture 300 may include any number of hardware and/or software applications that are executed to facilitate any of the operations. In exemplary embodiments, one or more I/O interfaces may facilitate communication between the authentication system 100, the system architecture 300, and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the authentication system 100 and the system architecture 300. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the authentication system 100 and the system architecture 300 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network any wired network, any wireless network, etc., for communication with external devices and/or systems.

As desired, embodiments of the invention may include the authentication system 100 and the system architecture 300 with more or less of the components illustrated in FIGS. 1 and 3.

Certain embodiments of the invention are described above with reference to block and flow diagrams of systems and methods and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method for authenticating an identity of a target person comprising:
   determining, from a first system graph comprising publicly available data, connections and connection strengths between one or more hypothetical identities and a plurality of related entities associated with the one or more hypothetical identities;
   deriving, from a second system graph comprising private data, connections and connection strengths between the target person and one or more real entities associated with the target person without requesting input from the target person;
   identifying matches between the target person and the one or more real entities associated with the target person and related entities associated with the one or more hypothetical identities based at least in part on the derived connections and connection strengths; and
   providing an indication of identity authentication of the target person based at least in part on the identified matches.

2. The computer-implemented method of claim 1, wherein the connections between the one or more hypothetical identities and the plurality of related entities comprise bi-directional connections.

3. The computer-implemented method of claim 1, wherein the connections between the one or more hypothetical identities and the plurality of related entities comprise at least first-degree connections.

4. The computer-implemented method of claim 1, further comprising determining a graph of at least one first degree connection between the one or more hypothetical identities and a plurality of related entities associated with the one or more hypothetical identities.

5. The computer-implemented method of claim 1, further comprising:
   determining one or more extended graphs having connections between at least a portion of the plurality of related entities associated with the hypothetical identities and associated extended entities associated with the plurality of related entities; and
   identifying matches comprising common real entities associated with the target person and the extended entities.

6. A system comprising:
   at least one memory for storing data and computer-executable instructions; and
   at least one processor configured to access the at least one memory and further configured to execute the computer-executable instructions to:
   determine, from a first system graph comprising publicly available data, connections and connection strengths between one or more hypothetical identities and a plurality of related entities associated with the one or more hypothetical identities;
   derive, from a second system graph comprising private data, connections and connection strengths between the target person and one or more real entities associated with the target person without requesting input from the target person;
   identify matches between the target person and the one or more real entities associated with the target person and related entities associated with the one or more hypothetical identities based at least in part on the derived connections and connection strengths; and
   provide an indication of identity authentication of the target person based at least in part on the identified matches.

7. The system of claim 6, wherein the connections between the one or more hypothetical identities and the plurality of related entities comprise bi-directional connections.

8. The system of claim 6, wherein the connections between the one or more hypothetical identities and the plurality of related entities comprise at least first-degree connections.

9. The system of claim 6, wherein the at least one processor is further configured to determine a graph of at least one first degree connection between the one or more hypothetical identities and a plurality of related entities associated with the one or more hypothetical identities.

10. The system of claim 6, wherein the at least one processor is further configured to: determine one or more extended graphs having connections between at least a portion of the plurality of related entities associated with the hypothetical identities and associated extended entities associated with the plurality of related entities; and
   identify matches comprising common real entities associated with the target person and the extended entities.

11. A non-transitory computer-readable medium that stores instructions executable by one or more processors to perform a method comprising:
   determining, from a first system graph comprising publicly available data, connections and connection strengths between one or more hypothetical identities and a plurality of related entities associated with the one or more hypothetical identities;

deriving, from a second system graph comprising private data, connections and connection strengths between the target person and one or more real entities associated with the target person without requesting input from the target person;

identifying matches between the target person and the one or more real entities associated with the target person and related entities associated with the one or more hypothetical identities based at least in part on the derived connections and connection strengths; and providing an indication of identity authentication of the target person based at least in part on the identified matches.

12. The computer-readable medium of claim 11, wherein the connections between the one or more hypothetical identities and the plurality of related entities comprise bi-directional connections.

13. The computer-readable medium of claim 11, wherein the connections between the one or more hypothetical identities and the plurality of related entities comprise at least first degree connections.

14. The computer-readable medium of claim 11, further comprising determining a graph of at least one first degree connection between the one or more hypothetical identities and a plurality of related entities associated with the one or more hypothetical identities.

15. The computer-readable medium of claim 11, further comprising:

determining one or more extended graphs having connections between at least a portion of the plurality of related entities associated with the hypothetical identities and associated extended entities associated with the plurality of related entities; and identifying matches comprising common real entities associated with the target person and the extended entities.

* * * * *